United States Patent [19]

Marasch

[11] Patent Number: 4,947,099
[45] Date of Patent: Aug. 7, 1990

[54] MOTOR CONTROLLER WITH OPTICAL SCR'S

[75] Inventor: Richard D. Marasch, Germantown, Wis.

[73] Assignee: Allen-Bradley Company, Inc., Milwaukee, Wis.

[21] Appl. No.: 303,344

[22] Filed: Jan. 30, 1989

[51] Int. Cl.$^5$ .............................................. H02P 5/40
[52] U.S. Cl. .................................. 318/809; 388/933; 388/917
[58] Field of Search ............... 318/809; 388/917–919, 388/933, 812, 813, 820; 307/646, 647

[56] References Cited

U.S. PATENT DOCUMENTS

| | | | |
|---|---|---|---|
| 3,693,060 | 9/1972 | Joyce | 317/262 |
| 3,866,097 | 2/1975 | Anzai et al. | 318/761 |
| 4,258,276 | 3/1981 | Beling | |
| 4,386,283 | 5/1983 | Roggwiller et al. | |
| 4,482,853 | 11/1984 | Bhavsar | 318/778 |
| 4,797,587 | 1/1989 | Tschudi et al. | 307/646 |

OTHER PUBLICATIONS

An article entitled, "Single Optically–Isolated Driver Controls Inverse–Parallel SCR'S", published in Electronic Design, May 24, 1980, p. 120.

*Primary Examiner*—David Smith, Jr.
*Attorney, Agent, or Firm*—Quarles & Brady

[57] ABSTRACT

A three-phase electric motor is coupled to each phase line of an electric source by pairs of SCR's coupled in inverse parallel relationship. One of the SCR's in each pair is triggered by a signal from a conventional motor control circuit which regulates the phase angle at which the SCR turns on. The other SCR in each pair is an optically triggered device which is activated by light emitted from an LED in one of the legs of a three-phase rectifier bridge in the control circuit power supply. When the LED within a leg of the power supply is forward biased so as to conduct current, it emits light which triggers a correspondingly biased opto-SCR to supply current to the motor. A separate transistor is connected in parallel across each of the LED's to provide a current shunt path when the motor is to be turned off so that the LED does not emit light and trigger the SCR.

10 Claims, 1 Drawing Sheet

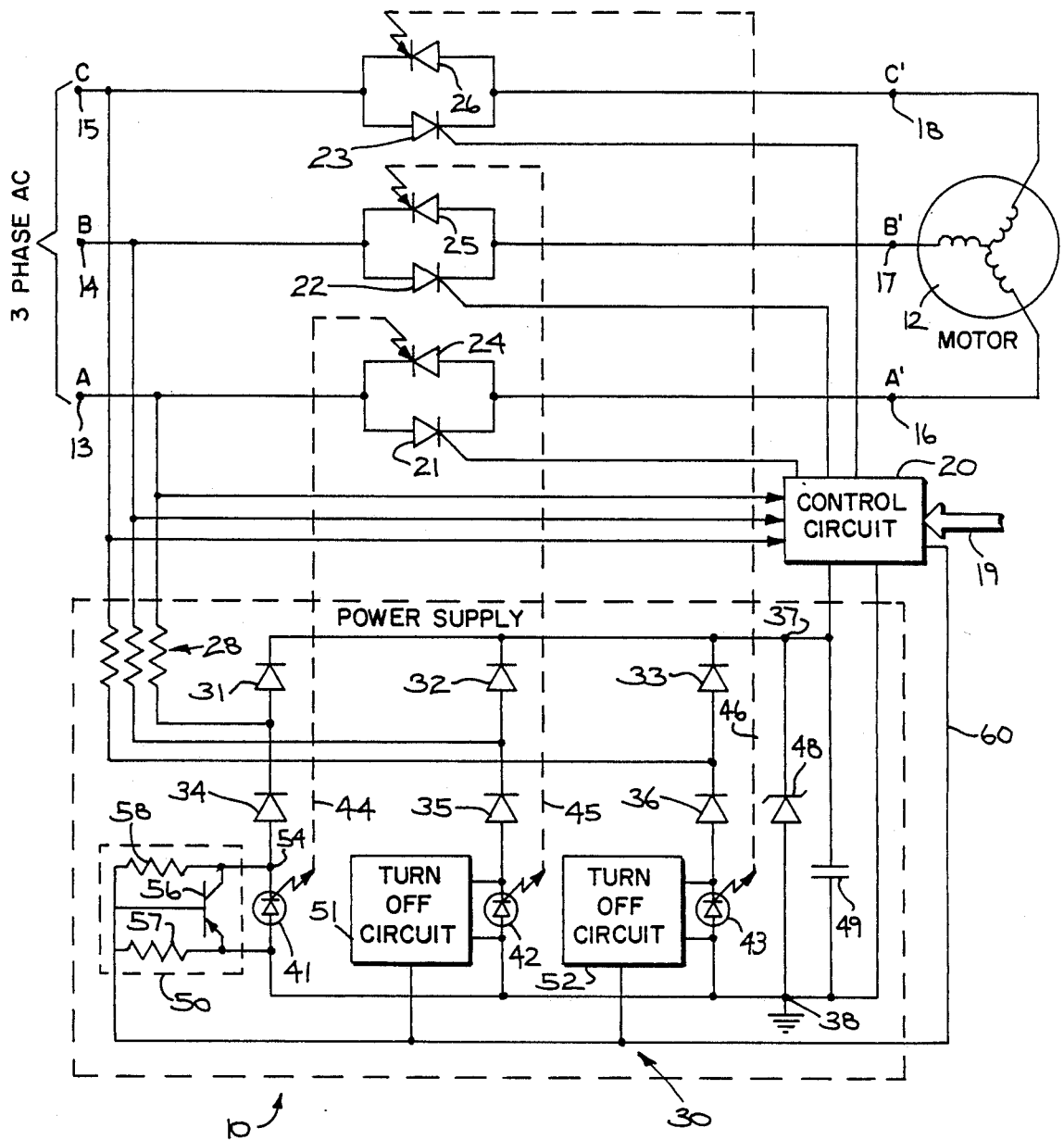

MOTOR CONTROLLER WITH OPTICAL SCR'S

BACKGROUND OF THE INVENTION

The present invention relates to systems for controlling the operation of an electric motor, a more particularly to such systems in which unidirectional electric switches are employed to control the application of electricity to the motor.

The operation of three-phase electric motors is frequently controlled by an apparatus which regulates the flow of electricity to the motor in order to reduce power consumption during the starting of the motor and control the motor speed during normal running conditions. Such apparatus commonly use thyristors to switch each phase of electricity to the motor. A typical configuration consists of two silicon controlled rectifiers (SCR) connected in an inverse parallel relationship for each phase of the electricity. An electronic control circuit senses the polarity of the alternating voltage for each phase and triggers the corresponding SCR's which are forward biased during each half cycle of the voltage. The control circuit also regulates the phase angle of the voltage cycle at which each SCR is triggered to control the magnitude of electricity applied to the motor and thereby control the power consumption and speed. For example, during the start up of the motor, the phase angle at which each SCR is triggered is gradually decreased so as to slowly increase the amount of electricity applied to the motor.

An alternative control system replaced one of the SCR's in each inverse parallel connected pair with a diode. The diode/SCR combination improves the stability of the motor control during starting. In this case, the connection of this phase of the electricity source to the motor was conductive for the entire half cycle of the voltage during which the diode was forward biased. This alternative eliminated the need to provide a trigger signal during this half cycle of the voltage for that phase. The problem with this circuit is that each diode remains conducting even when the motor is turned off by the control circuit. Although the SCR's in the control circuit are turned off, current still can flow through the diodes and leak to the motor housing which is typically grounded. This leakage current deteriorates the insulation and components within the motor.

Previous controllers overcame this problem by utilizing two inverse parallel connected SCR's in each phase and triggering one of the SCR's during the entire half cycle of the supply voltage during which the SCR was forward biased. As a result of this triggering, one of the SCR's acted as a diode. Although this operation solved the problem of current leakage when the motor was turned off, it still required a complex control circuit to apply a second trigger pulse for each phase of the motor supply voltage and consumed additional power for the triggering.

SUMMARY OF THE INVENTION

An apparatus for controlling an electric motor includes first and second unidirectional electrical switches connected in an inverse parallel relationship coupling the motor to a source of electricity. The first unidirectional electric switch is electrically activated by a signal from a control circuit which regulates the times at which that switch is turned on. A power supply is provided to furnish electricity to the control circuit. The power supply includes a voltage rectifier and a light emitter connected in series. The emitter is optically coupled to the second unidirectional electric switch so that light from the emitter will activate that switch. The light emitter and its associated SCR are connected into the control circuit so that light triggers the SCR when it is forward biased.

In an enhanced version of the present invention, a means is provided to inhibit the emitter from producing light when the motor is turned off. This inhibitor can be a transistor connected in parallel with the light emitter to create a switchable shunt path for the electricity to bypass the emitter when the motor is turned off. When the transistor is rendered conductive thereby closing the shunt path, electricity still is furnished by the power supply to the control circuitry.

A general object of the present invention is to provide a stable system for controlling the application of electricity to an electric motor in which each phase of that electricity is controlled by two inverse parallel connected unidirectional electric switches.

Another object of the present invention is to provide a means for economically and simply operating one of the electric switches to function as a diode.

Yet another object of the present invention is to activate one of the unidirectional electric switches optically utilizing light generated by the current flowing through the power supply for the system. This technique reduces the power consumption as the existing power supply current activates the switches.

A further object of the present invention is to incorporate a mechanism for deactivating the diode-operating unidirectional electric switch when the motor is turned off.

BRIEF DESCRIPTION OF THE DRAWING

The drawing is a block schematic diagram of a motor controller incorporating the present invention.

DETAILED DESCRIPTION OF THE INVENTION

With reference to the drawing, a motor control circuit, generally designated as 10, couples an AC electric motor 12 to three phases, A, B, and C, of a source of alternating electricity. The three phases of electricity are applied to input terminals 13, 14, and 15 and the motor 12 is connected to three output terminals 16, 17, and 18 of the control system 10. A first silicon-controlled rectifier (SCR) 21 connects the first input terminal 13 to the first output terminal 16. Similarly, second and third SCR's 22 and 23 couple the second and third input terminals 14 and 15 to the second and third output terminals 17 and 18, respectively. A first optically triggered SCR 24 is connected in an inverse parallel relationship with the first SCR 21. Similarly, second and third optically triggered SCR's (opto-SCR's) 25 and 26 are connected in inverse parallel relationships with the second and third SCR's 22 and 23, respectively.

The system 10 contains a conventional control circuit 20 which in response to the voltages at each of the three input terminals 13, 14, and 15 produces signals for triggering the three SCR's 21-23. The operation of the control circuit is governed by signals on a set of input lines 19 which indicate when to start and stop the motor and its speed. These signals can originate at a manual control panel, for example. The control circuit 20 can be any of several standard devices that regulate the phase angle of the input voltage for the motor at which each of the respective SCR's is triggered. This controlling of the phase angle triggering controls the amount of electricity applied to the motor and provides a slow start and speed regulation for the motor using well known techniques.

The system 10 also includes a power supply 30 which furnishes a DC voltage to the control circuit 20. The power supply 30 is coupled to the three input terminals 13-15 by three resistors 28 which drop the three phase voltages to levels compatible with the supply requirements of the control circuit 20. The three resistors 28 supply electricity to a three-phase rectifier bridge having six diodes 31-36, each forming a leg of the rectifier bridge. Specifically, diodes 31, 32, and 33 couple each of the resistors 28 to a positive output terminal 37 for the power supply. The remaining diodes 34, 35, and 36 of the rectifier bridge are each connected in series with a separate light emitting diode (LED) 41, 42, and 43, respectively. Each series combination of a diode and an LED couples one of the resistors 28 to a ground terminal 38 of the power supply. The diodes are connected so that the voltage potential at terminal 37 will be positive with respect to the ground terminal 38.

The first LED 41 is optically coupled to the first opto-SCR 24, as indicated by dashed line 44, so that the light emitted by the LED will trigger the SCR. Although LED 41 and opto-SCR 24 are shown as separate devices, they typically are mounted in a common package to provide the optical coupling. Similarly, the second LED 42 is optically coupled to the second opto-SCR 25 and the third LED 43 is optically coupled to the third opto-SCR 26, as indicated by dashed lines 45 and 46 respectively. The LED's are placed in the proper legs of the rectifier bridge so that they will be forward biased and emit light when their associated opto-SCR is also forward biased.

A zener diode 48 and a filter capacitor 49 are connected in parallel between the positive terminal 37 and the ground terminal 38 of the power supply 30. These terminals 37 and 38 are also connected to the power input terminals of the control circuit 20 to furnish a DC voltage for powering the control circuit.

The power supply 30 further includes a separate, identical turn-off circuit 50, 51, and 52 coupled in parallel with each of the LED's 41, 42, and 43. The details of the turn off circuits are shown for the first one 50. The first turn off circuit 50 includes a shunt transistor 56 coupled across the first LED 41 and two biasing resistors 57 and 58. The base of the shunt transistor 56 is coupled to an output line 60 from the control circuit 20 which controls the operation of the turn-off circuit 50, as will be described. Each of the other turn-off circuits 51 and 52 also are coupled to the control circuit output line 60.

When the control circuit 20 receives an input command via input lines 19 indicating that the motor 12 is to be turned on, it applies trigger pulses to each of the SCR's 21, 22, and 23 during the positive half cycle of the corresponding AC phase A, B, or C to which the SCR's are connected. The trigger signals are applied at different phase angles with respect to the AC voltage cycle in order to regulate the amount of current applied to the motor in a conventional manner.

At the same time a positive control voltage is applied via line 60 to turn off the shunt transistors 56 in the turn off circuits 50-52. Therefore, during the negative half cycle of the voltage at each of the input terminals A, B, and C, light is emitted from the LED 41, 42, or 43 which is connected to that phase line. This light activates the optically coupled opto-SCR 24, 25, or 26 during the negative half cycle of each phase. For example, during the negative half cycle of the voltage for phase A at the first input terminal 13, current will flow within the power supply 30 from the ground terminal 38 through the first LED 41, diode 34, and one of the resistors 28 to the first input terminal 13. This flow of electricity will produce light from the first LED 41 which is coupled to the first opto-SCR 24 rendering that SCR conductive. As a result, during the negative half cycles of the voltage appearing at the input terminal 13, the first opto-SCR 24 will be conductive allowing current to flow from the first output terminal 16 to the first input terminal 13. The remaining LED's 42 and 43 similarly emit light to turn on their associated opto-SCR 25 and 26 during the negative half cycles of the respective phase voltages at terminals 14 and 15.

This activation of the opto-SCR's 24, 25, and 26 causes them to act as diodes without the need for trigger pulses from control circuit 20 whenever the motor is turned on. Since the current for triggering the opto-SCR's comes from the rectifier bridge of the system power supply 30, very little additional power is expended in this triggering as compared to using trigger signals from control circuit 20.

When the control circuit 20 receives a command via input lines 19 to turn off the motor 12, it ceases triggering SCR's 21, 22, and 23. At this time, the control circuit also emits a negative voltage on control line 60 which is coupled to each of the turn-off circuits 50-52. This negative control voltage turns on the shunt transistors 56 in each of the turn-off circuits. When the shunt transistors 56 are conductive, current will flow through them bypassing the LED connected in parallel with the transistor.

When the motor is turned off, current still flows through each leg of the rectifier bridge in the power supply 30 to furnish power to the control circuit 20. However, with the transistors 56 in each of the turn-off circuits 50-52 rendered conductive at this time, the current does not flow through the LED's 41-43. Since the current in not flowing through the LED's 41-43, they will not emit light and the opto-SCR's 24, 25, and 26 will not be turned on. As a consequence, the opto-SCR's do not function as diodes when the motor is turned off, eliminating the possibility of current leakage through the motor and the adverse effects previously discussed.

I claim:

1. An apparatus for controlling an electric motor comprising:
   a first unidirectional electrical switch coupling the motor to a source of electricity and being activated by an electrical signal to apply electricity from the source to the motor;
   a second unidirectional electrical switch connected in inverse parallel relationship to said first unidirectional electrical switch and being optically activated to apply electricity from the source to the motor;
   a control circuit for electrically activating the first unidirectional electrical switch;
   a light emitter coupled to the source of electricity with light from the emitter optically coupled to activate said second unidirectional electrical switch; and a switch element providing a shunt path for current to bypass said light emitter when the motor is turned off thereby preventing said light emitter from emitting light.

2. The apparatus as recited in claim 1 further comprising a power supply for furnishing electric current to said control circuit; and wherein said light emitter is energized by current flowing through the power supply to said control means.

3. The apparatus as recited in claim 2 wherein said power supply further includes a means for rectifying electric current applied from the source to said control circuit with said means for rectifying being coupled in series with said light emitter between the source and said control circuit.

4. The apparatus as recited in claim 1 wherein said switch element is controlled by said control circuit.

5. An apparatus for controlling a three-phase alternating current electric motor comprising:
   first, second, and third input terminals for connecting the apparatus to three phases of alternating current;
   first, second, and third output terminals for connecting the apparatus to the motor;
   first, second, and third unidirectional electrical switches activated by a signal applied to a control terminal, wherein said first unidirectional electrical switch couples the first input terminal to the first output terminal, said second unidirectional electrical switch couples the second input terminal to the second output terminal, and said third unidirectional electrical switch couples the third input terminal to the third output terminal;
   fourth, fifth and sixth unidirectional electrical switches activated by a signal applied to a control terminal, wherein said fourth unidirectional electrical switch is connected in inverse parallel relationship to said first unidirectional electrical switch, said fifth unidirectional electrical switch is connected in inverse parallel relationship to said second unidirectional electrical switch, and said sixth unidirectional electrical switch is connected in inverse parallel relationship to said third unidirectional electrical switch;
   a control circuit for producing signals to activate said first, second, and third unidirectional electrical switches into conductive states wherein the activation can occur at different varying the phase angles of the alternating current;
   a first means, coupled to said first input terminal, for producing a signal to activate said fourth unidirectional switch into a conductive state during substantially on-half of each cycle of the alternating current supplied at said first input terminal;
   a second means, coupled to said second input terminal, for producing a signal to activate said fifth unidirectional switch into a conductive state during substantially on-half of each cycle of the alternating current supplied at said second input terminal;
   a third means, coupled to said third input terminal, for producing a signal to activate said sixth unidirectional switch into a conductive state during substantially on-half of each cycle of the alternating current supplied at said third input terminal; and
   a separate switchable shunt circuit connected in parallel with each of said means for producing a signal, and being rendered conductive when the motor is turned off thereby disabling said first, second and third means from producing a signal to activate the respective unidirectional switch.

6. The apparatus as recited in claim 5 further comprising a power supply for said control circuit including a voltage rectifier bridge connected to said first, second and third input terminals, and connected to two supply terminals; and
   wherein each of said first, second and third means for activating is electrically coupled in series with said rectifier bridge between the respective one of said input terminals and one of the supply terminals.

7. The apparatus as recited in claim 5 further comprising a means for supplying power to said control circuit including a voltage rectifier bridge connected to said first, second, and third input terminals, and connected to two supply terminals across which a DC potential is produced by the rectifier bridge; and
   wherein each of said first, second and third means for activating includes a light emitter electrically connected in series with said rectifier bridge between one of the first, second and third input terminals and one of the supply terminals, and further includes means for activating one of said fourth, fifth and sixth unidirectional switches in response to light generated by the emitter.

8. An apparatus for controlling a three-phase alternating current electric motor comprising:
   first, second, and third input terminals for connecting the apparatus to three phases of alternating current;
   first, second, and third output terminals for connecting the apparatus to the motor;
   first, second, and third unidirectional electrical switches each for applying electricity to the motor, wherein said first unidirectional electrical switch couples the first input terminal to the first output terminal, and said third unidirectional electrical switch couples the third input terminal to the third output terminal;
   fourth, fifth and sixth unidirectional electrical switches for applying electricity to the motor, wherein said fourth unidirectional electrical switch is connected in inverse parallel relationship to said first unidirectional electrical switch, said fifth unidirectional electrical switch is connected in inverse parallel relationship to said second unidirectional electrical switch, and said sixth unidirectional electrical switch is connected in inverse parallel relationship to said third unidirectional electrical switch;
   a control circuit for activating the first, second, and third unidirectional electrical switches into conductive states;
   means for supplying power to said control circuit including three rectifiers coupling said input terminals to a first power supply terminal, and further including three sets of a rectifier and a light emitter with each set being electrically coupled between a different one of said input terminals and a second power supply terminal; and
   means for activating each of said fourth, fifth and sixth unidirectional electrical switches in response to the light from a different one of the emitters.

9. The apparatus as recited in claim 8 further comprising means for disabling the light emitters from emitting light when the motor is turned off.

10. The apparatus as recited in claim 9 wherein said means for disabling includes a separate switchable shunt circuit connected in parallel with each of the light emitters and being rendered conductive when the motor is turned off.

* * * * *

UNITED STATES PATENT AND TRADEMARK OFFICE
CERTIFICATE OF CORRECTION

PATENT NO. : 4,947,099
DATED : August 7, 1990
INVENTOR(S) : Richard D. Marasch

It is certified that error appears in the above-identified patent and that said Letters Patent is hereby corrected as shown below:

In Column 6,
    at Line 36, after "terminal," insert --said second unidirectional electrical switch couples the second input terminal to the second output terminal,--

Signed and Sealed this

Fourteenth Day of January, 1992

Attest:

HARRY F. MANBECK, JR.

*Attesting Officer*      *Commissioner of Patents and Trademarks*